July 8, 1924.
J. C. ADAMS
1,500,914
SAWMILL DOG HANDLING AND OPERATING MECHANISM
Filed July 13, 1922     2 Sheets-Sheet 1
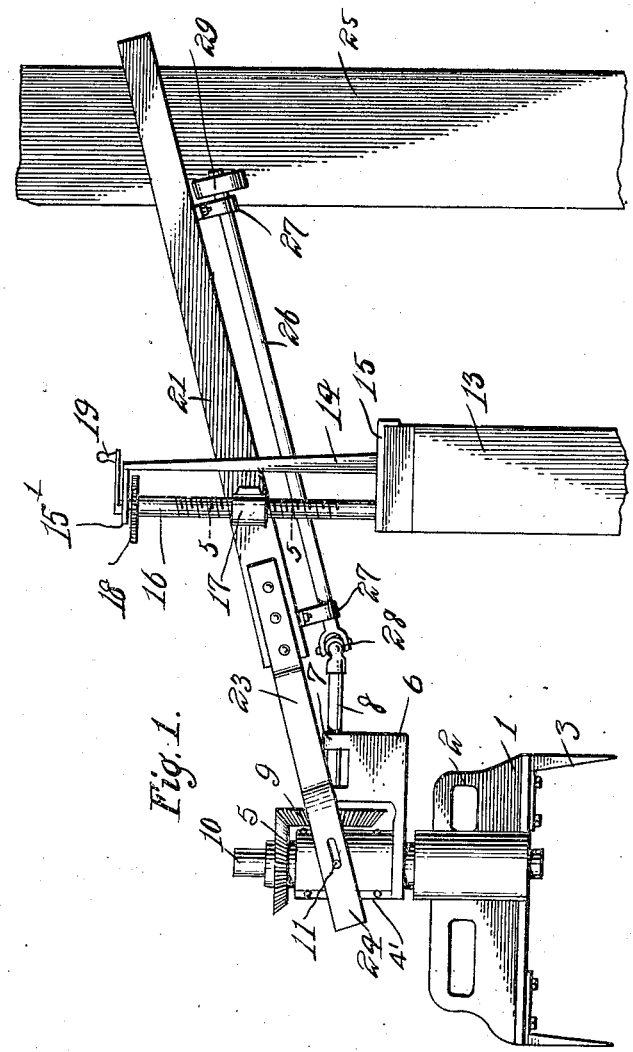
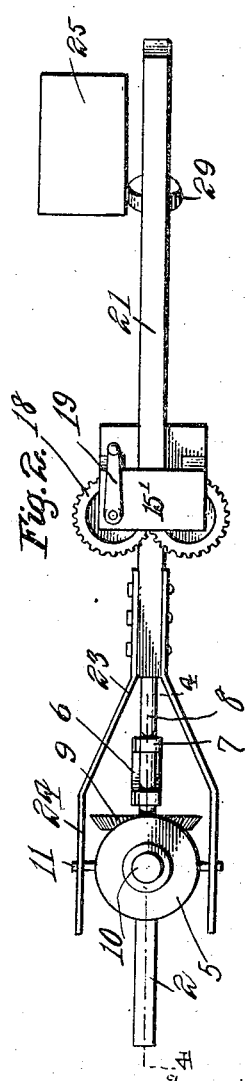
Inventor
James C Adams
By Richard B Owen
Attorney July 8, 1924.

J. C. ADAMS 1,500,914

SAWMILL DOG HANDLING AND OPERATING MECHANISM

Filed July 13, 1922    2 Sheets-Sheet 2

Witnesses
F. N. Taylor

Inventor
James C. Adams.
By Richard B. Owen
Attorney

Patented July 8, 1924.

1,500,914

UNITED STATES PATENT OFFICE.

JAMES C. ADAMS, OF McCOLL, SOUTH CAROLINA.

SAWMILL-DOG HANDLING AND OPERATING MECHANISM.

Application filed July 13, 1922. Serial No. 574,702.

*To all whom it may concern:*

Be it known that I, JAMES C. ADAMS, a citizen of the United States, residing at McColl, in the county of Marlboro and State of South Carolina, have invented certain new and useful Improvements in a Sawmill-Dog Handling and Operating Mechanism, of which the following is a specification.

The present invention relates to a sawmill dog and has for its principal object to provide a mechanism whereby the dog may be lifted and adjusted with considerable ease.

Another important object of the invention is to provide means for rotating the dog as the same is being lifted or lowered.

Another important object of the invention is to provide a vertically adjusted fulcrum device for the dog lifting lever.

A still further object of the invention is to produce a sawmill dog of this nature provided with a regulating mechanism which will be efficient, reliable in operation, durable, comparatively inexpensive to manufacture, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is an elevation of the mechanism embodying my invention,

Figure 2 is a top plan thereof,

Figure 3:
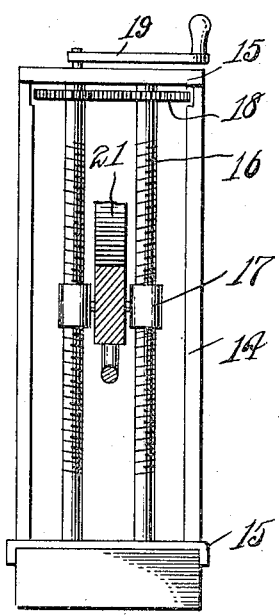
Figure 3 is a detailed elevation of the fulcrum adjustable mechanism.
Figure 4:
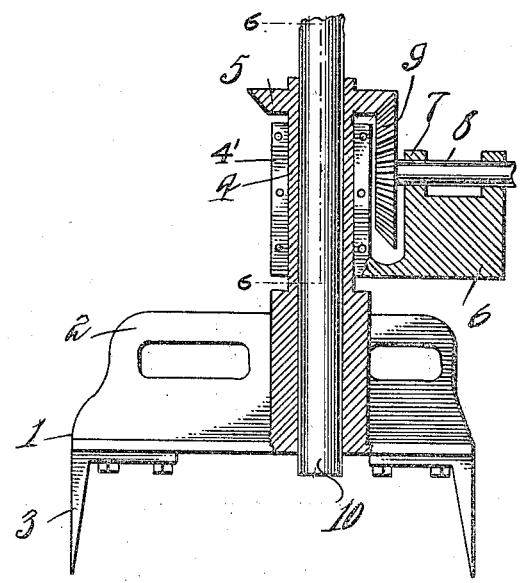
Figure 4 is a detailed vertical section through the dog itself.

Referring to the drawing in detail it will be seen that 1 designates the dog which is provided with the body 2 having situated on the lower end thereof the prongs or teeth 3 which are adapted to engage the log in a manner well understood by those skilled in this art. A vertical extension 4 is provided on the upper end of the dog which includes a beveled gear 5 either keyed thereto or formed integral therewith. A journal bracket 6 extends horizontally from the sleeve 4' and is provided with the journals 7 which support a shaft 8 upon which is mounted a beveled gear 9 meshing with the beveled gear 5. A bar 10 extends vertically through the body 2 and the extension 4. The sleeve 4' is disposed about the extension 4 so that the dog may be rotated. The sleeve is provided with the trunnions 11.

Figure 5:
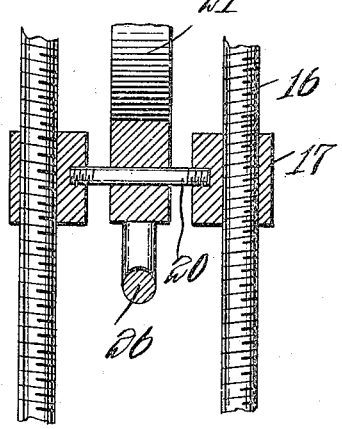
Figure 5 is a detailed section taken substantially on the line 5—5 of Figure 1.
Figure 6:
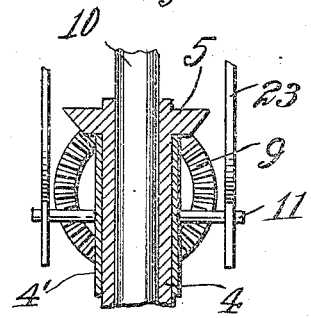
Figure 6 is a detailed section taken substantially on the line 6—6 of Figure 4.

A suitable support 13 has mounted thereon a fulcrum mechanism which includes a frame consisting of the standards 14 which are vertically disposed and are attached at their lower ends to a plate 15 resting on the support 13 and at their upper ends support a plate 15'. A pair of oppositely threaded shafts 16 are journaled between the plates 15 and 15'. A pair of sleeves 17 are mounted on the shafts 16, one on each, and are provided with internal opposite threads for co-operating with the threads on the shafts 16. The shafts 16 have mounted at their upper ends the meshing gears 18 and a crank 19 is provided on the terminal of one of the shafts 16 so that upon rotation thereof both of the shafts will be rotated in opposite directions to each other thereby causing the sleeves 17 to move upwardly or downwardly. As is shown to advantage in Figure 5 a pin 20 provided with threaded ends is engaged with the sleeves and prevents their rotation. A lever 21 is fulcrumed on the pin 20 and it will therefore be seen that the fulcrum point of this lever may be adjusted vertically as may be desired.

The lever 21 has mounted upon its end adjacent the sawmill dog a pair of spaced arms 23 which diverge from each other and terminate in slotted parallelly extending plates 24. The slots in these plates 24 receive the ends of the trunnions 11. By fulcruming the lever 21 it will be seen that the dog may be raised vertically and the pin 11 will be allowed to slip in the slots of the plates 24 thereby preventing the dog from moving in the arc of a circle.

A post 25 is vertically situated adjacent the free end of the lever 21. A shaft 26 is journalled in the brackets 27 mounted on the lever and is connected to the shaft 8 by the universal joint 28. The end of the shaft 26 has mounted thereon a wheel or roller 29 which may be engaged with the post 25 or disengaged therewith. When the roller is engaged with the post and the lever fulcrumed it will be seen that the dog will be rotated through the intermediacy of the shafts 26 and 8 and the cog wheels 9 and 5. The lever 21 is preferably formed of some slightly yieldable material so that the free end thereof may be slightly distorted so as to engage or disengage the wheel 29 with the post 25 or this lever could, if preferred, be made rigid and sufficient play be provided at the fulcrum point of the lever with the pin 20. This, however, is merely a mechanical expedient which can be varied to suit the material being used and other circumstances.

The foregoing description and the accompanying drawings merely disclose the preferred structure of my invention and it is to be understood that numerous changes in the details of construction and in the combination and arrangement of parts may be resorted to without departing from the spirit of the invention as hereinafter claimed.

Having thus described my invention what I claim as new is:—

1. In combination, a sawmill dog, a lever for raising and lowering the sawmill dog, said sawmill dog being mounted rotatably on one end of the lever, a post situated adjacent the other end of the lever, a shaft rotatable on the lever, a wheel on the shaft adapted to be placed in and out of engagement with the post for rotation thereof upon movement of the lever, and means actuated by the shaft for rotating the sawmill dog.

2. In combination, a sawmill dog, a lever, a fulcruming device for the lever, means for raising and lowering the fulcruming device, said sawmill dog rotatably mounted on one end of the lever, and means for rotation of the sawmill dog upon actuation of the lever in the manner and for the purpose specified.

3. In combination, a sawmill dog, a lever for raising and lowering the sawmill dog, said sawmill dog being rotatably mounted on one end of the lever, a beveled gear keyed to the sawmill dog, a second beveled gear for actuating the first beveled gear, a shaft for the second beveled gear, a second shaft rotatably mounted on the lever, a universal joint connecting the two shafts, a post situated adjacent the free end of the lever, a wheel disposed on the end of the second shaft and adapted to be placed in engagement with the post so as to rotate the shaft for rotation of the sawmill dog through the intermediacy of the beveled gears upon actuation of the lever in the manner and for the purpose specified.

4. In combination, a saw mill dog, a lever for raising and lowering the saw mill dog, said saw mill dog being rotatably mounted on the lever, a post situated adjacent the lever, and means mounted on the lever engageable with the post and connected with the saw mill dog so as to rotate the latter upon movement of the lever when engaged with the post.

In testimony whereof I affix my signature in presence of two witnesses.

JAMES C. ADAMS.

Witnesses:
W. H. HUBBARD,
J. L. BUSCH.